SOLID STATE DEVICE FOR OPENING AND CLOSING
AN ELECTRICAL CIRCUIT
Filed May 16, 1966

INVENTOR.
NORMA J. VANCE
BY Rummler & Snow
Attys.

United States Patent Office 3,399,330
Patented Aug. 27, 1968

3,399,330

SOLID STATE DEVICE FOR OPENING AND CLOSING AN ELECTRICAL CIRCUIT

Norma J. Vance, 1460 Sandberg Terrace, Chicago, Ill. 60610

Filed May 16, 1966, Ser. No. 550,187
5 Claims. (Cl. 317—232)

ABSTRACT OF THE DISCLOSURE

A solid state electrical device has a ferrite material disposed between electrodes. The material exhibits a high resistance in one state and a low resistance in another state, the states being reversibly changeable by application of current of one or the other polarity respectively.

This invention relates to electric circuit breakers and, more particularly, to an electronic DC switch which functions without moving parts or contacts.

In the field of switches and relays for use in compact devices, prime importance is attached to simplicity of design and lightness. This is especially true of circuit design in space technology where component parts and circuits are necessarily confined to small dimensions. It is under these stringent conditions that this invention effectively functions.

Accordingly, it is the primary object of this invention to provide a DC electrical switch which is extremely small in size and functions without the use of mechanically moving parts.

It is a further object of this invention to provide a solid state switch or relay involving no moving parts which can be controlled by a radio frequency or DC pulse.

It is yet another object of this invention to provide a solid state switch or relay which utilizes a unique cell structure of ferrite material for determining the current capability of the switching function and the frequency response to the pulse control signal.

Briefly, the invention has for one of its embodiments the provision of a ferrite cell of nickel alloy with iron or bismuth or germanium or magnesium or selenium, in various combinations.

An application of a radio frequency pulse or a DC pulse will cause the cell to change from a relatively high resistance value to a state of high electrical conductivity and with the cell connected in a load circuit it will function effectively as an on-off "crowbar" type of switch. Conversion or switching the cell from one state to the other state is achieved by applying a reverse polarity of the radio frequency or DC pulse to the cell for each switching operation.

Other advantages and objects of the invention will become apparent from a study of the following specification and drawings, in which.

Figure 1:
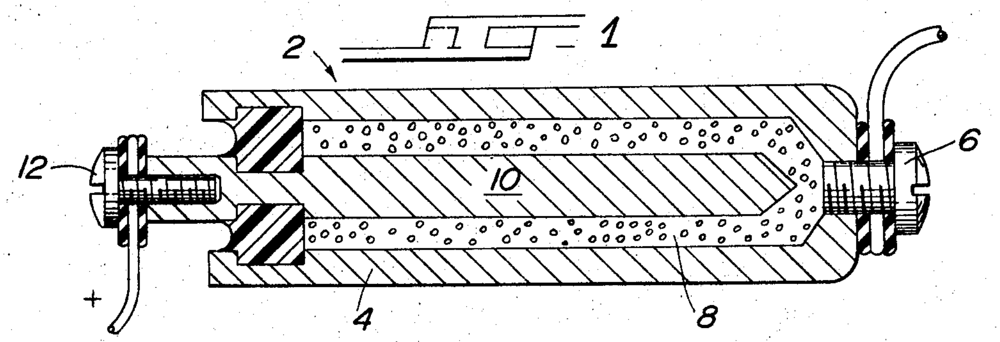
FIG. 1 is an axial cross sectional view of the ferrite cell used in accordance with the principles of this invention.

Referring now to FIG. 1, a cell structure 2, which hereinafter will be termed the "Ertia" cell, is composed of a brass case 4 of a hollow tubular configuration with one end having a small screw hole for receiving a lead screw 6 with an appropriate wire conductor. The other end of the case 4 is open for receiving a given amount of a ferrite material 8 and an electrode 10 centered within the ferrite material 8 and having an appropriate lead screw 12. The ferrite material 8 may be composed of a nickel alloy with iron or a nickel alloy with bismuth and germanium or ferrite material with selenium and magnesium. This material will exhibit a very high static resistance and a very small capacitance, and its current capability and breakdown, or firing point, will be determined by the quantity of material and the component geometry. The unique properties of this material exhibit a very low current leakage with good stand-off voltage in the inactivated state. However, when the cell 2 containing the ferrite material 8 is activated, or fired, when connected in a load circuit as will be more fully explained below, it becomes for all practical purposes a short circuit similar to a mechanical on-off switch. The activation of the cell 2 is accomplished by subjecting it to a momentary pulse of radio frequency energy condition or advancing the stand-off voltage of the cell to the firing point or breakdown. The cell resistance, then, becomes very low and therefore functions as a conducting device which will remain in this mode no matter what the voltage or current is within specification until the cell is unfired or unlatched. This latter step is accomplished simply by reversing the voltage potential or amplitude of the appropriate signal.

Figure 2:
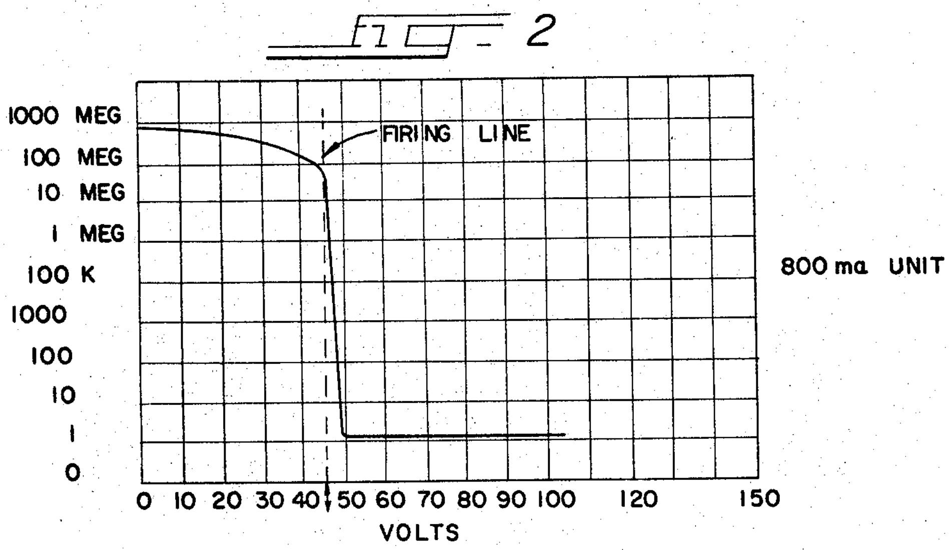
FIG. 2 is a graph illustrating the degree of change from resistance to conductivity within the ferrite cell.

The firing or activation voltages on the cell should have an amplitude of value of 30 to 50 volts with 40 volts being predictable as shown in the graph of FIG. 2. Converting the cell back to a high resistance level is achieved by applying either a radio frequency or DC pulse of opposite polarity as previously mentioned. As shown in FIG 2, the degree of change from resistance to conductivity is extremely sharp, and in tests made on the cell structure according to this invention it was found to operate with the application of various pulse time durations from .1 microsecond to several seconds. Further, the cell 2 was shown to have a current capability of 200 ma. and a breakdown greater than 600 volts.

Figure 3:
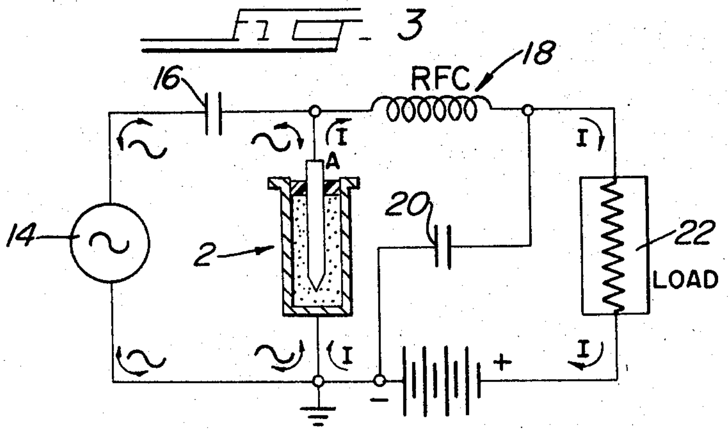
FIG. 3 is a schematic diagram showing the ferrite cell connected to a load and a radio frequency pulse signal.

Referring now to FIG. 3, the Ertia cell 2 is shown functioning as an instantaneous "crowbar" type of switch in a direct current load circuit. It is to be understood that the Ertia cell structure 2 is not limited to the circuitry shown in FIG. 3 but may have various other uses as for example a relay or a memory device in a computer in accordance with the aforesaid principles of this invention. Returning now to the example shown in FIG. 3, a source 14 of radio frequency energy is coupled by capacitor 16 to the Ertia cell casing or anode 4 by means of lead screw 6. The material 8 is then activated by the pulse signal causing the resistance of the cell 2 to approach zero ohms, thereby completing the circuit, and allowing DC current to flow through an RF choke coil 18 and a resistive load 22. Capacitor 16 also acts as a DC voltage locking device to protect the radio frequency energy source 14. The RF choke coil 18 and capacitor 20 function as an RF filter preventing the RF component from flowing in the DC load current. By reversing of the RF energy or DC pulse, the anode 4 and the electrode or cathode 10 of the Ertia cell 2 present a very high resistance and thus act like a switch in the DC circuit. Further, it is to be understood that the turn-on and turn-off time of the cell will depend on the RL and C values 16, 18 and 20. The radio frequency source 14 need not necessarily be of local origin for example, a radio frequency tuned circuit may receive remote RF signals or energy for the activating function of the Ertia cell, and the cell, therefore, can be made conductive or resistive by the application of either a positive or negative pulse.

As previously mentioned, one possible use for the Ertia cell of this invention would be a memory or information storage device in a computer and, as in the case of a relay device or a switch, this particular function would be accomplished without mechanical moving parts.

Although only one embodiment of the invention has been depicted and described, it will be apparent that this embodiment is illustrative in nature and that a number of modifications in the apparatus and variations in its end use may be effected without departing from the spirit or scope of the invention as defined in the appended claims.

I claim:

1. In a switching device, the combination comprising a conductive casing, a ferrite material having a high resistance state positioned in said casing, an electrode spaced from said casing and disposed in said ferrite material, said electrode and said casing connected to a pulse signal source means for changing the high resistance state of said ferrite material to a state of high electrical conductivity and said ferrite material being reconvertible to the high resistance state upon a reversal of polarity.

2. In a switching device according to claim 1, wherein said ferrite material is composed of nickel alloy and iron, magnesium, selenium and bismuth.

3. In a switching device according to claim 1, wherein said ferrite material is composed of nickel alloy, bismuth and germanium.

4. In a switching device according to claim 1, wherein said ferrite material is composed of nickel alloy, magnesium and selenium.

5. In a switching device according to claim 1, wherein said electrode means is further connected to a load circuit having a DC power supply.

References Cited

UNITED STATES PATENTS

| | | | |
|---|---|---|---|
| 2,001,698 | 3/1935 | Andre | 317—233 |
| 3,271,584 | 9/1966 | Ovshinsky | 307—88.5 |
| 3,271,591 | 9/1966 | Ovshinsky | 307—88.5 |

JAMES D. KALLAM, *Primary Examiner.*